United States Patent [19]

Speckhart et al.

[11] Patent Number: 4,688,646
[45] Date of Patent: Aug. 25, 1987

[54] IMPACT FORCE SHAPING HEAD

[75] Inventors: Frank H. Speckhart; John N. Snider, both of Knoxville, Tenn.

[73] Assignee: University of Tennessee Research Corporation, Knoxville, Tenn.

[21] Appl. No.: 474,424

[22] Filed: Mar. 16, 1983

Related U.S. Application Data

[63] Continuation of Ser. No. 394,502, Jul. 2, 1982, abandoned, which is a continuation of Ser. No. 157,796, Jun. 9, 1980, abandoned.

[51] Int. Cl.⁴ .............................................. B23B 45/16
[52] U.S. Cl. .................................... 173/139; 188/299; 188/314; 267/119; 267/127; 267/137; 267/64.11
[58] Field of Search ............... 188/282, 297, 299, 314, 188/315, 319, 320, 317; 267/119, 127, 130, 137, 64.11; 173/131, 139

[56] References Cited

U.S. PATENT DOCUMENTS

| | | | |
|---|---|---|---|
| 1,774,614 | 9/1930 | Rode | 267/119 |
| 2,308,404 | 1/1943 | Thornhill | 267/64 R |
| 2,392,061 | 1/1946 | Pfeiffer | 91/278 X |
| 2,426,155 | 8/1947 | Rode | 267/119 |
| 2,584,339 | 2/1952 | Georgeff | 267/119 |
| 3,040,841 | 6/1962 | Schultze | 188/299 |
| 3,086,622 | 4/1963 | Shultze | 188/315 |
| 3,362,210 | 1/1968 | Perrone | 267/119 X |
| 3,596,773 | 8/1971 | Peterson | 188/282 X |
| 3,625,321 | 12/1971 | Lutz | 188/314 |
| 3,706,362 | 12/1972 | Faure | 188/320 X |
| 3,945,663 | 3/1976 | Duckett | 188/315 X |

FOREIGN PATENT DOCUMENTS

| | | | |
|---|---|---|---|
| 341030 | 1/1931 | United Kingdom | 188/299 |
| 1207706 | 10/1970 | United Kingdom | 188/319 |

Primary Examiner—George E. A. Halvosa
Attorney, Agent, or Firm—Luedeka & Neely

[57] ABSTRACT

An impact force shaping head includes an elongated casing having an interior wall, an open end and a closed end and contains a liquid. A piston is slidingly mounted within the casing and extends longitudinally beyond the open end of the casing. The piston sealingly engages the interior wall of the casing to define a liquid-filled first chamber between the piston and the closed end of the casing. A reservoir contains liquid and a conduit connects the first chamber with the reservoir. A control valve controls the flow of liquid through the conduit. The control valve is operative in response to changes in the pressure of the liquid contained in the first chamber.

11 Claims, 3 Drawing Figures

IMPACT FORCE SHAPING HEAD

The present application is a continuation of U.S. application Ser. No. 394,502, filed July 2, 1982, now abandoned, which was a continuation of U.S. application Ser. No. 157,796, filed June 9, 1980, now abandoned.

The present invention relates to an apparatus for varying the pattern of force applied when a first object is struck with a second object to drive the first object in the direction of impact. More particularly, it relates to a head for interposition between a hammer and a driven body for distributing the force of impact in a desired pattern over a period of time and in accordance with the driving conditions encountered by the driven body.

There are a wide variety of applications in which an object is driven through a resisting material by repeatedly striking the object with another object. A very simple example is a hammer driving a nail into a piece of wood. On a larger scale, pilings are driven into the ground by repeatedly striking the end of the piling with a large weight, another form of hammer, until the desired depth of insertion is achieved.

It is well-known that the most efficient driving results are not always achieved by directly striking the driven object with a rigid hammer. Such a procedure results in a very large initial force which is quickly dissipated. In other words, a graph of force vs. time appears as a sharp spike. Far more efficient driving is often achieved when the same total momentum, the area under the spike of the graph, is applied as a lower force distributed over a longer period of time. Consequently, various attempts have been made to provide a head which is interposed between the hammer and the driven object, such as a piling, to absorb a portion of the initial impact and spread the applied force over time. The simplest such head comprises a block of wood. However, the limited resiliency and uncontrollable nature of wood limits the applications considerably, particularly when large amounts of energy are involved.

In the area of pile driving, for example, where the forces of impact are very large, various resiliently deformable heads have been provided. In general, these heads have attempted to spread the impact force evenly over time. That is, their goal has been to provide a constant driving force to the driven object. However, it has been determined that a constant driving force does not always result in the most efficient driving of the object.

When an object is embedded in a resisting material, such as a piling embedded in the ground, the initial force required in order to overcome friction and start the object in motion is substantially greater than the amount of force required to keep the object in motion once it has started. Therefore, a driving force which reaches an initial peak sufficient to initiate motion and then drops to a lower generally constant level for an extended period of time is an extremely efficient force pattern for driving an object.

In the course of pile driving, for example, the materials through which the pile passes are quire variable in their characteristics, particularly in their resistance to the pile. As a result, the types of driving forces which are most effective vary with the type of soil being penetrated. A head which must be replaced or even manually adjusted when new soil conditions are encountered is not desirable. The cost of maintaining multiple heads and the losses of time are prohibitive. A head which is remotely adjustable to provide variable force patterns provides substantial savings of time as well as equipment.

Another problem encountered particularly with equipment in which large amounts of energy are transferred by impact, such as in pile driving, is that the head absorbs substantial energy in the form of heat. Eventually the head heats up to the point that the operation of the head is adversely affected. Cooling is therefore a valuable feature of an impact head.

It is therefore an object of the present invention to provide a head for interposition between a hammer and a driven body for shaping the force pattern resulting from impact to provide an initial peak of force sufficient to overcome friction, followed by a lower and more constant force extended over time. It is also an object to provide a head which permits adjustment of the force pattern applied in accordance with the conditions encountered by the driven body. It is an additional object to provide a head which is efficiently cooled during operation and which can withstand the harsh conditions of heavy construction.

Various other objects and advantages will be apparent when the following description is considered along with the accompanying drawings in which.

Figure 1:
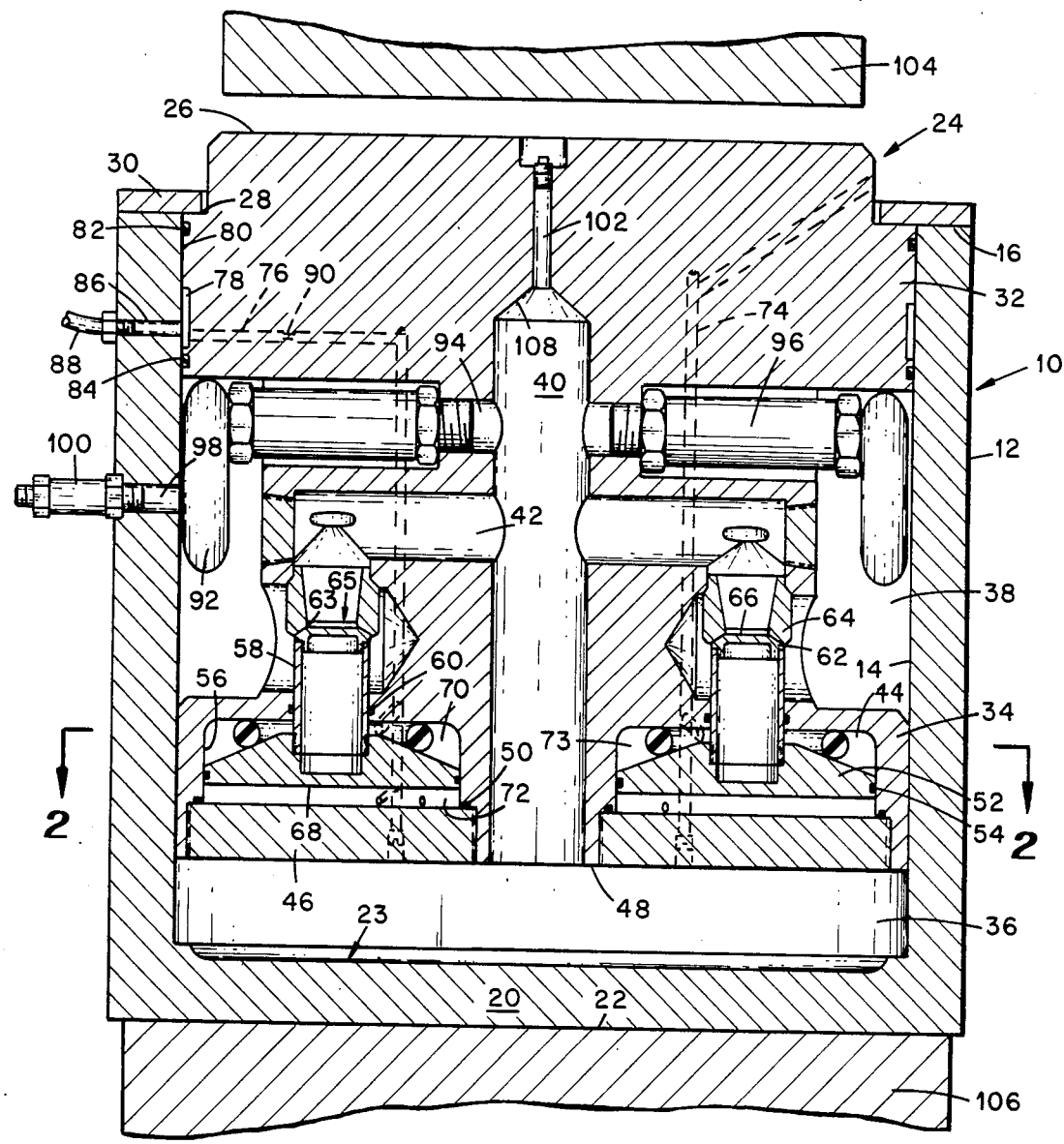
FIG. 1 is a schematic view of an impact force shaping head embodying various of the features of the present invention.

Generally, in accordance with the present invention, an impact head is provided which includes a casing having an interior wall, an open end and a closed end. A body of liquid is contained within the casing. A piston is slidingly mounted within the casing and extends longitudinally beyond the open end of the casing. The piston sealingly engages the interior wall to define a liquid-filled first chamber between the piston and the closed end of the chamber. The liquid-filled chamber initially transfers impact forces directly from the piston to the casing because the liquid, such as water, is substantially incompressible. Conduit means including an orifice provide flow communication between the first chamber and a reservoir defined in the head to absorb a portion of the impact force. Bias means control the flow of liquid from the chamber into the reservoir during an impact. The bias means are operative in response to changes in the pressure of the liquid contained within the chamber.

Referring to the drawings, a cylindrical casing 10 is provided, including a cylindrical wall 12 having an interior surface 14 and an upper rim 16, and a planar lower end wall 20 having an outer force transferring surface 22. The cylindrical wall 12 defines a cylindrical bore 23 and an elongated piston 24 is slidingly mounted within the bore 23. In the depicted embodiment, one bore is defined in the casing 10 and one piston 24 is coaxially mounted within the bore 23. However, it is understood that several bores 23 may be defined within a single casing, with a separate piston 24 being mounted within each bore.

The piston 24 extends longitudinally from the bore 23, beyond the upper rim 16 of the casing 10 and terminates in a planar impact surface 26 defined by a peripheral shoulder 28. A collar 30, attached to the casing 10 as with bolts, prevents withdrawal of the piston 24 through engagement with the shoulder 28 of the piston 24. The impact surface 26 is oriented perpendicular to the longitudinal axis of the piston 24 and parallel to the force transferring surface 22 of the lower end wall 20.

The piston 24 includes an upper annular portion 32 and a spaced-apart lower annular portion 34. Each of the annular portions 32 and 34 engages the interior wall 14. The lower annular portion 34, in combination with the interior wall 14 and the lower end wall 20, defines a first liquid-filled chamber 36 which is generally cylindrical in shape and coaxial with the piston 24 and the casing 10. A second liquid-filled chamber, or reservoir 38, is defined by the piston 24 and the wall 14, between the upper annular portion 32 and the lower annular portion 34. Thus the reservoir 38 is generally annular. As noted hereinabove, the lower annular portion 34 engages the interior wall 14 to prevent direct fluid communication between the chamber 36 and the reservoir 38. However, the chamber 36 and reservoir 38 are interconnected by a plurality of conduits for controlled fluid communication.

A liquid-filled central conduit 40 extends upwardly from the first chamber 36 along the central axis of the piston 24. The diameter of the central conduit 40 is approximately one-eighth of the diameter of the lower annular portion 34.

Four control conduits 42 are defined in the piston 24 to interconnect the central conduit 40 with the reservoir 38. Means are also provided within the piston 24 for controlling liquid flow through the control conduits 42 during application of an impact force. Such flow is restricted or prevented unless the liquid pressure within the first chamber 36 and the central conduit 40, caused by compression of the piston 24 into the casing 10, exceeds a value which is predetermined in accordance with variable operating conditions.

In the depicted embodiment, four cylindrical, control chambers 44 are defined in the piston 24, each control chamber 44 being associated with one of the control conduits 42. The chambers 44 are vertically oriented and access to the chambers 44 is provided through individual covers 46 threadably mounted in the lower surface 48 of the piston 24. It will be recognized, however, that either a greater or lesser number of control chambers 44 may be provided and that the control chambers 44 may be oriented other than vertically. A resilient sealing ring 50 is mounted in the piston 24 at the periphery of each of the covers 46 to prevent fluid flow around the covers 46.

A control piston 52 is mounted within each of the control chambers 44 for vertical sliding motion. The control piston 52 is generally conical in shape and carries a resilient sealing ring 54 at the peripheral edge to sealingly engage the cylindrical side wall 56 of the chamber 44. A piston rod 58 extends axially upwardly from the piston 52 into the control conduit 42. A resilient sealing ring 60 prevents fluid flow to or from the chamber 70 around the periphery of the piston rod 58.

The piston rod 58 carries a coaxial plug 62 at the distal end, opposite from the control piston 52. The plug 62 is adapted to engage a seat 64 which defines a vertical portion of the control conduit 42. The lower rim 63 of the seat 64 defines an orifice 65. The plug 62 includes a pressure receiving surface 66 which is in direct fluid communication with the central conduit 40 through the control conduit 42. The surface 66 is parallel to the lower surface 68 of the control piston 52, so that pressure applied to the surface 66 of the plug 62 is directly opposed by pressure applied to the surface 68 of the control piston 52.

The control piston 52 divides the control chamber 44 into two separate, variable sized chambers, an upper chamber 70 and a lower chamber 72, with the piston rod 58 extending upwardly through upper chamber 70 and into the control conduit 42. Fluid pressure within the lower chamber 72 causes the plug 62 to normally engage the seat 64, thus preventing liquid flow through the control conduit 42. A resilient O-ring 73, or alternatively a coil spring, is coaxially mounted around the piston rod 58 in the upper chamber 70 to keep the fluid path partially open between the conduit 42 and the reservoir 38. That is, as desired, the orifice 65 may be maintained partially open to restrict liquid flow but not prevent liquid flow.

Figure 2:
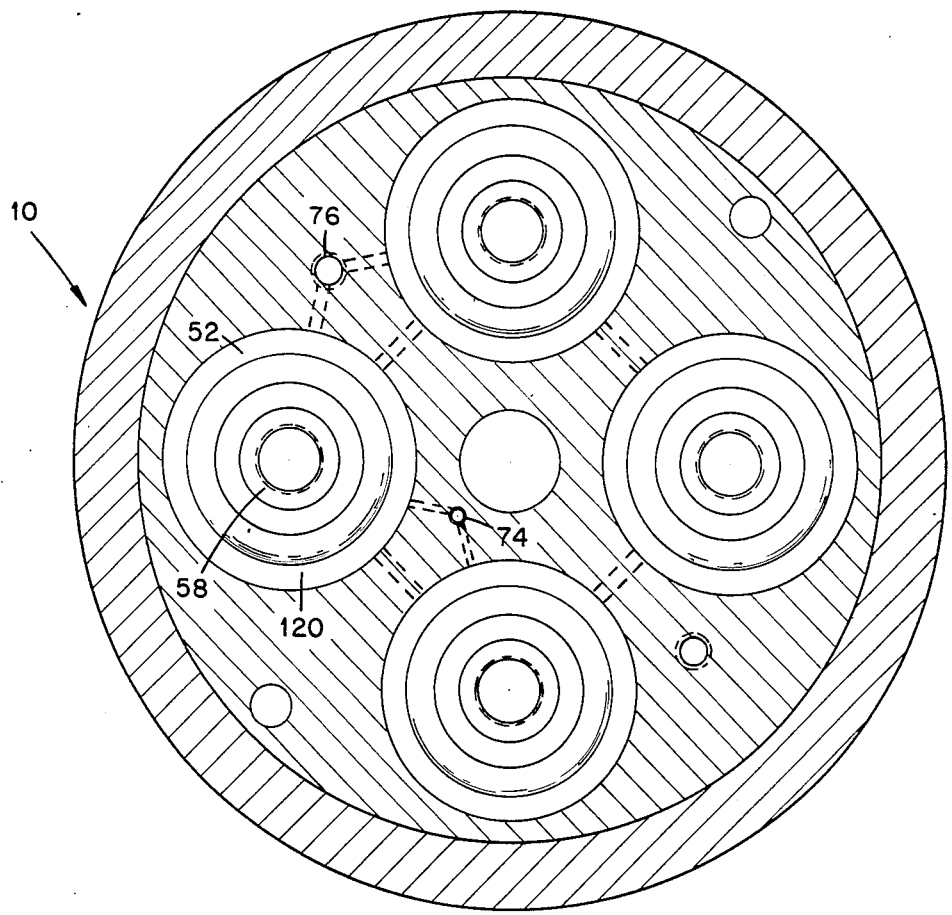
FIG. 2 is a cross-sectional view taken along line 2—2 in FIG. 1.

A passageway 74 extends from the interconnected upper chambers 70 (see FIG. 2) to the exposed portion of the piston 24, above the shoulder 28, where it vents to the atmosphere. In this manner, the upper chambers 70 are constantly maintained at atmospheric pressure.

Pressurized fluid, such as air, is supplied to the interconnected lower chambers 72 (see FIG. 2) through a passageway 76, which connects the lower chamber 72 to an annular cavity 78 defined in the outer surface 80 of the annular portion 32. Resilient circumferential, sealing rings 82 and 84 are mounted in the annular portion 32 of the piston 24, above and below the cavity 78, respectively, to sealingly engage the surface 14. A passageway 86 is defined in the casing 10, below the collar 30, to provide fluid flow communication between the cavity 78 and a source of pressurized fluid, such as a standard air compressor (not shown), through a flexible tube 88. In this manner, the lower chambers 72 are pressurized to any desired pressure, while the upper chambers 70 remain at atmospheric pressure. Thus, the amount of pressure required to longitudinally displace the control piston 52 and release the plug 62 from the seat 64, opening the orifice 65, is controllable through adjustment of the resisting fluid pressure applied to the lower chambers 72 through the tube 88. The applied fluid pressure is not interrupted by vertical movement of the piston 24 because the annular cavity 78 compensates for such relative vertical movement. The flexible nature of the tube 88 permits the casing 10 to move vertically without disrupting the airflow through the tube 88.

The passageway 76 includes a restricted portion 90 which has a cross-sectional area substantially smaller than the cross-sectional area of the remainder of the passageway 76, for example by a factor of about 100. The restricted portion 90 permits fluid flow in either direction, to permit adjusted increases or decreases in the fluid pressure within the lower chamber 72 from a remote location. However, the restricted passageway prevents rapid fluid flow in either direction, such as upon application of an impact force to the head 10.

Resiliently compressible means are provided for expanding the effective volume of the reservoir 38 as liquid enters the reservoir through the control conduit 42. In the depicted embodiment the compressible means comprises an impermeable flexible, toroidal tube 92 containing an easily compressible gas such as air or nitrogen. As liquid is forced into the reservoir 38, the tube 92 is compressed, thus expanding the effective volume of the reservoir 38. Alternatively, a flexible diaphragm or spring-biased piston could be employed as a wall of the reservoir 38 to expand the effective volume of the reservoir 38.

Four lateral conduits 94, equally spaced about the circumference of the piston 24, like spokes, interconnect the reservoir 38 with the central conduit 40. A check valve 96 is threadably mounted within each of the conduits 94 to permit liquid flow from the reservoir 38 to the central conduit 40 when the liquid pressure within the reservoir is greater than the liquid pressure within the central conduit 40 and first chamber 36. The valves 96, standard ball and spring check valves, prevent any liquid flow from the central conduit 40 through the conduits 94 to the reservoir 38.

A passageway 98 is defined in the casing wall 12 to provide flow communication between a liquid source (not shown) and the reservoir 38. A check valve 100 is threadably mounted in the passageway 98 to permit a constant trickle flow from the liquid source to the reservoir 38 and prevent liquid flow outwardly from the reservoir 38 through the conduit 98.

A central conduit extension 102, having a diameter substantially less than the diameter of the central conduit, e.g., by a factor of about seven, for example, extends from the central conduit 40 to the impact surface 26 to vent any gases which may enter the first chamber 36 or the central conduit 40. The extension 102 also provides an outlet for the constant trickle flow of liquid which enters the head through the passageway 98. The constant flow of liquid through the piston 24 serves to dissipate heat energy which develops because of the repeated compressive forces, thus cooling the piston 24 during operation.

In operation, the head is located between a hammer 104 and an object 106 to be driven. The head may be either mounted upon the driven object 106 or form a portion of the hammer 104. That is, the head may be attached to the driven object 106 at the surface 22 or attached to the hammer 104 at the surface 26. For purposes of description, the former situation is assumed herein.

When a hammer 104 first strikes the surface 26 of the rigid piston 24, the impact force is directly transferred to the lower surface 48 of the piston 24 and the upper surface 108 of the central conduit 40. The force is then applied to the liquid contained in the first chamber 36 and the central conduit 40. Because the liquid is essentially incompressible, the force is initially transferred to the rigid casing 10 which in turn applies the force to the driven object 106. However, friction causes the object 106 to resist the driving force and as a result, the liquid within the first chamber 36 and central conduit 40 is pressurized and seeks an outlet.

The liquid is prevented from flowing through the conduits 94 by the check valves 96. The liquid is also initially prevented or at least restricted, from flowing through the orifice 65. However, when the force of the liquid upon the surface 66 of each plug 62 exceeds the opposing pressure force of the air contained in the lower chamber 72, the plug 62 is vertically displaced away from the seat 64. Then the liquid is free to flow through the control conduit 42 to the reservoir 38, relieving the pressure in the first chamber 36.

As liquid enters the reservoir 38 through the control conduit 42, the liquid pressure within the reservoir 38 is raised slightly because there is temporarily no outlet from the reservoir 38. The check valve 100 prevent escape through the conduit 98 toward the liquid source. Also, the liquid pressure within the central conduit 40 is greater than the liquid pressure within the reservoir 38 while the plug 62 is displaced so that liquid flow through the valves 96 is prohibited. Therefore, in order to accommodate the incoming liquid, gas contained within the flexible tube 92 is compressed by the addition of liquid to the reservoir 38. The tube 92 is relatively easily compressed, so that there is a substantial pressure drop through the orifice 65.

As the impact force applied by the hammer 104 begins to drop, the liquid pressure within the first chamber 36 and central conduit 40 starts to fall. When the pressure applied by the liquid to the surface 66 is reduced below the opposing force of the pressurized air in the chamber 72, the piston 52 moves upwardly to prevent or at least restrict flow through the control conduit 42. At that point, the elevated pressure of liquid within the reservoir 38 opens the check valves 96 to permit liquid flow through the conduits 94 back into the central conduit 40 and first chamber 36. The liquid is urged to flow through the conduits 94 by the expansion of the tube 92. A generally constant elevated pressure within the first chamber 36 maintains contact between the surface 23 and the hammer 104 for an extended period of time.

Figure 3:
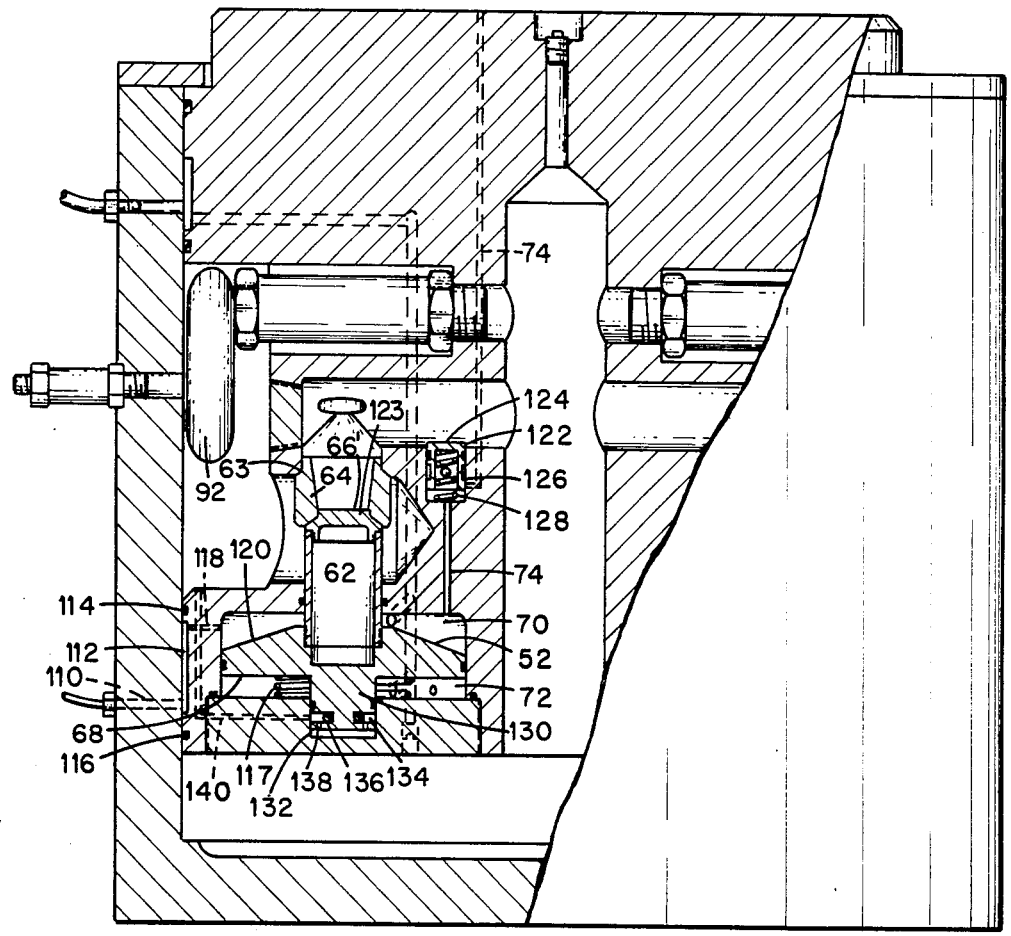
FIG. 3 is a schematic view of a modified impact force shaping head embodying various of the features of the present invention.

In the embodiment depicted in FIG. 3, further control of the pattern of the applied force is provided. A passageway 110 is defined in the casing 10, to provide flow communication from a secondary air source (not shown) to an annular cavity 112 defined in the lower annular portion 34 of the piston 24. Resilient sealing rings 114 and 116 are mounted on the piston 24 above and below the cavity 112, respectively, to prevent fluid flow between the cavity 112, the reservoir 38 and first chamber 36, respectively.

A coil spring 117 is coaxially mounted within the lower chamber 72 to provide a desired initial position for the piston 52 after each impact.

A passageway 118 is defined in the lower annular portion 34 between the cavity 112 and the upper chamber 70 to provide flow communication therebetween. By introducing air into the upper chamber 70, the pressure upon the upper surface 120 of the piston 52 is raised to a level which overcomes the upward pressures within the lower chamber 72. The piston 52 is then moved downwardly, disengaging the stopper from the seat 64 to permit restricted flow through the control conduit 42.

A normally closed spool valve 122 is located within the vent passageway 74 to prevent the release of air when the upper chamber 70 is pressurized. The valve 122 is spring biased to a closed position and includes a pressure surface 124 which is perpendicular to the axis of the spool 126. The surface 124 is located within the control conduit 42. When the liquid pressure within the passageway 42, and therefore the first chamber 36, exceeds a predetermined level, the spool 126 is forced downwardly against the opposing pressure of the spring 128 to open the valve 122 and vent the chamber 70 to the atmosphere.

In the embodiment depicted in FIG. 3, the plug 62 includes a generally cylindrical extension 123 which extends upwardly into the seat 64. The extension 123 includes a surface 66' which corresponds to the surface 66 shown in FIG. 1. The extension 123 permits the plug 62 to be moved downwardly by liquid within the conduit 42 for a short period of time without allowing liquid to enter the reservoir 38. In this manner, the impact force pattern is further adjustable because the period of direct force application, the initial peak, may be extended without increasing the resisting force of the fluid in the chamber 72.

Through appropriate adjustment of the liquid pressure required to open the valve 122, and the opposed pressures applied to the upper surface 120 and the lower surface 68 of the piston 52, the timing and rate of liquid flow through the conduit 42 are adjustable and the shape of the initial spike of energy is fully controllable.

Means are also provided for damping the axial movement of the piston 52 to prevent resonance thereof. As depicted in FIG. 3, the piston 52 includes a second piston rod 130 which extends downwardly through the lower chamber 72 and partially into a damping chamber 132. An annular cavity 134 is defined in the distal end of the piston rod 130 to carry a resilient air-filled bag 136. The cavity 134 is freely communicable with the chamber 132 through apertures 138. A narrow passageway 140 is defined in the lower annular portion 34 of the piston to provide limited flow communication between the damping chamber 132 and the reservoir 38. The reservoir 38 serves primarily as a liquid source for the chamber 132 and cavity 134. The narrow passageway 140 prevents rapid liquid flow from the chamber 132 as the piston 52 is forced downwardly by liquid pressure upon the surface 66. Instead, as the piston 52 moves downwardly, the liquid within the chamber 132 and cavity 134 compresses the gasfilled bag 136. The resistance of the bag 136 to compression is proportional to the speed at which the piston 52 moves. Therefore resonance of the piston 52 is diminished.

In contrast to prior force shaping heads in which impact forces are shaped by adjusting the resisting pressure of a volume of compressed gas, the presently described head permits the force pattern to be shaped by controlling the pressure drop which occurs as a liquid flows through a controlled orifice. The size of the orifice is adjustable as is the period of time for which the orifice maintains a given size.

Impact force shaping heads in accordance with the present invention provide full control of the pattern of the force applied to a driven object by a hammer. The initial force is adjustable to the level necessary to overcome friction, then the force is lowered to the desired level and maintained over an extended period of time. In this manner, the optimum pattern of energy is developed for each type of condition encountered by the driven object. Moreover, adjustments are made simply by varying the fluid pressures applied to the head from a remote location. By using standard measuring instruments the rate of driving can be continuously monitored and used as a basis for continuous adjustments of fluid pressures.

While a preferred embodiment of the present invention has been defined with particularly herein, it will be understood that there is no intent to limit the invention by such disclosure, but rather, it is intended to cover all modifications and alternate constructions falling within the spirit and scope of the invention as defined in the appended claims.

I claim:

1. A driving head for interposition between a hammer and a driven body for receiving the impact of the hammer and distributing the force of impact to the driven body over a period of time comprising:

an elongated casing having an interior wall, an open end and a closed end and containing a liquid;

a head piston slidingly mounted within said casing and extending longitudinally beyond said open end of said casing;

said head piston sealingly engaging said interior wall to define a liquid-filled first chamber between said head piston and said closed end of said casing;

a reservoir containing liquid;

first conduit means providing flow communication between said first chamber and said reservoir;

at least one control means for controlling the flow of liquid through said first conduit means during an impact, said control means comprising:

a valve member disposed in said first conduit means for opening and closing to control the flow of liquid in said first conduit means, said valve member having at least one surface in contact with the liquid in said conduit means;

a control chamber defined within said head piston and containing fluid, the diameter of said control chamber being substantially greater than the length of said control chamber;

a control piston slidingly mounted within said control chamber dividing said control chamber into a high pressure chamber and a low pressure chamber; said high pressure chamber containing fluid at a selected higher pressure than fluid contained in said low pressure chamber;

said control piston being operatively connected to said valve member so that the fluid in the high pressure chamber acts to maintain the valve member in a closed position preventing the flow of liquid in said first conduit means;

said valve member being operable to open and allow liquid flow through said first conduit means in response to an increase in liquid pressure in said first chamber and in said first conduit means in contact with said surface of said valve member when the hammer impacts the driving head sufficient to act upon said surface of said valve member to move said control piston in said control chamber to increase the fluid pressure in said high pressure chamber; and said control chamber and said control piston being operable to close said valve member when the pressure of the liquid in said first conduit means in contact with said surface of said valve member drops and the fluid pressure in said high pressure chamber acts on said control piston to close said valve member.

2. The driving head of claim 1 further comprising means for maintaining said control means in a partially open position whereby the initial impact force of the hammer is reduced.

3. A pile driving head for a pile driver for interposition between a pile driving hammer and a driven pile for receiving the impact of the hammer and distributing the force of the impact to the driven pile over a period of time comprising:

an elongated casing having an interior wall, an open end and a closed end and containing a liquid;

a head piston slidingly mounted within said casing and extending longitudinally beyond said open end of said casing;

said head piston sealingly engaging said interior wall to define a liquid-filled first chamber between said head piston and said closed end of said casing;

a reservoir containing a liquid;

first conduit means providing flow communication between said first chamber and said reservoir;

at least one control means for controlling the flow of liquid through said first conduit means during an impact, said control means comprising:

a valve member disposed in said first conduit means for opening and closing to control the flow of liquid in said first conduit means, said valve member having at least one surface in contact with the liquid in said first conduit means;

a control chamber defined within said head piston and containing fluid, the diameter of said control chamber being substantially greater than the length of said control chamber;

a control piston slidingly mounted within said control chamber dividing said control chamber into a high pressure chamber and a low pressure chamber;

said high pressure chamber containing fluid at a selected higher pressure than fluid contained in said low pressure chamber;

said control piston being operatively connected to said valve member so that the fluid in the high pressure chamber acts to maintain the valve member in a closed position preventing the flow of liquid in said first conduit means;

said valve member being operable to open and allow liquid flow through said first conduit means in response to an increase in liquid pressure in said first chamber and in said first conduit means in contact with said surface of said valve member when the hammer impacts the driving head sufficient to act upon said surface of said valve member to move said control piston in said control chamber to increase the fluid pressure in said high pressure chamber;

said control chamber and said control piston being operable to close said valve member when the pressure of the liquid in said first conduit means in contact with said surface of said valve member drops and the fluid pressure in said high pressure chamber acts on said control piston to close said valve member;

a source of constant and continously adjustable pressurized fluid connected to said high pressure chamber;

second conduit means connecting said source to said high pressure chamber; and a restriction open at all times formed in said second conduit to substantially prevent rapid fluid escape from said high pressure chamber during the impact of the hammer whereby, when the impact of the hammer causes the valve member to open and move said control piston into said high pressure chamber, said restriction prevents rapid escape of the fluid from the high pressure chamber so that the fluid pressure in said high pressure chamber increases to a pressure greater than the pressure in said second conduit means between said source and said restriction.

4. The apparatus of claim 3 wherein said at least one control means comprises a plurality of said control means disposed symetrically within said head piston.

5. The apparatus of claim 3 wherein said at least one control means comprises four control means formed within said head piston.

6. The driving head of claim 3 wherein:

said head piston further comprises an upper annular portion and a lower annular portion, each of the upper and lower annular portions sealingly engaging said interior wall of said casing and defining an annular reservoir between said interior wall and said piston; and said at least one control means comprises a plurality of control means, each controlling the flow of liquid between said first chamber and said annular reservoir.

7. The driving head of claim 3 further comprising:

means for introducing liquid into said reservoir; and vent means disposed adjacent to the top of said head piston for venting fluids from said first chamber.

8. The driving head of claim 3 further comprising means for damping resonating motion of said control piston.

9. The driving head of claim 3 further comprising resiliently compressible means located within said reservoir.

10. A driving head for transferring the impact of a hammer to a driven object comprising:

an elongate casing having an interior wall, an open end and a closed end and containing a liquid, said casing being in contact with the driven object;

a head piston slidingly mounted within said casing and extending longitudinally beyond said open end of said casing for being forced into said casing by the impact of the hammer and being operable to pressurize the liquid within said casing and to transfer the impact force to said casing and the driven object;

an upper annular portion and a lower annular portion formed on said head piston with each of said portions sealingly engaging the interior wall of said casing;

an annular reservoir defined by said upper annular portion, said lower annular portion, the interior wall of said casing and said head piston for receiving and containing liquid;

a main chamber defined between the closed end of said casing and said head piston for containing liquid;

a central conduit formed in said head piston extending from said main chamber into the center of said head piston;

at least one output radial conduit extending radially outwardly from said central conduit to said annular reservoir;

a one-way valve disposed in said output radial conduit for selectively opening and allowing liquid flow in said radial conduit from said central conduit to said annular reservoir and for blocking fluid flow in said radial conduit from said annular reservoir to said central conduit;

control means for opening said one-way valve in said radial conduit when the liquid pressure in said output radial conduit is above a predetermined pressure and for closing said one-way valve when said liquid pressure in said output radial conduit is below the predetermined pressure;

at least one input radial conduit extending radially inwardly from said annular reservoir to said central conduit;

a check valve disposed in said input radial conduit for allowing liquid flow through said input radial conduit only in the direction from said annular reservoir to said central conduit; and resiliently compressible means disposed within said annular reservoir for being compressed when the hammer impacts the driving head and liquid flows into said annular reservoir from said output radial conduit and for expanding to force liquid out of said reservoir through said input radial conduit when the hammer is not impacting the head.

11. The driving head of claim 10 wherein said at least one output radial conduit comprises a plurality of output radial conduits with a one-way valve and control means for each of said output radial conduits.

* * * * *